Dec. 18, 1962   E. SUSSMAN   3,068,667
ADJUSTABLE TORQUE SENSITIVE COUPLINGS
Filed June 5, 1961
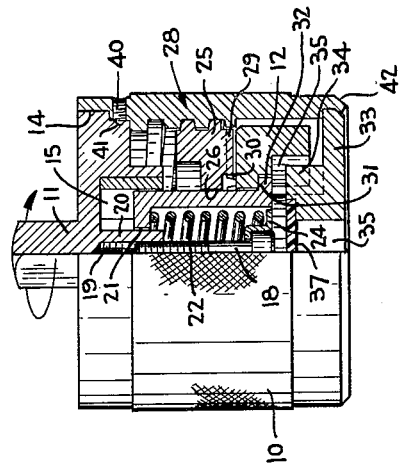
FIG. 2
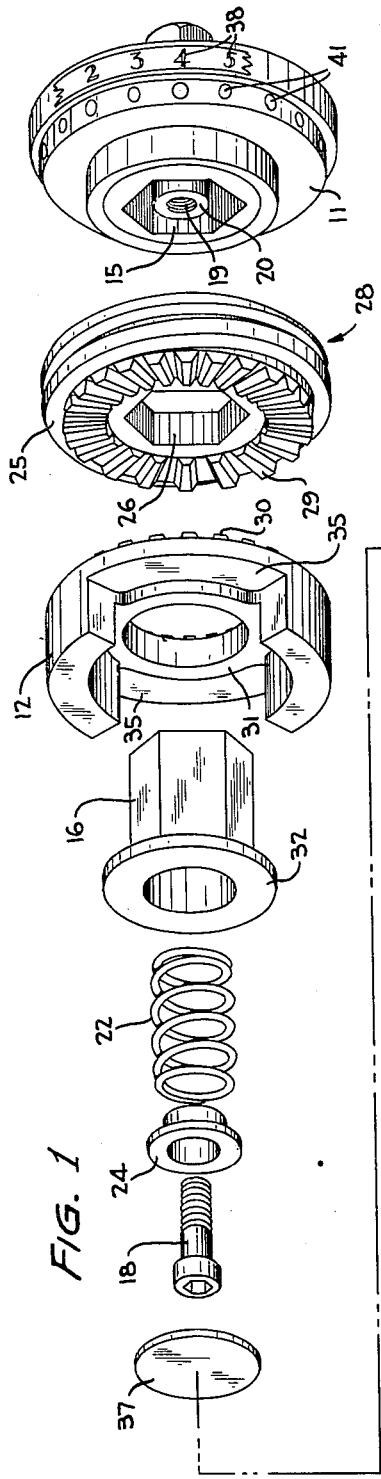
FIG. 1
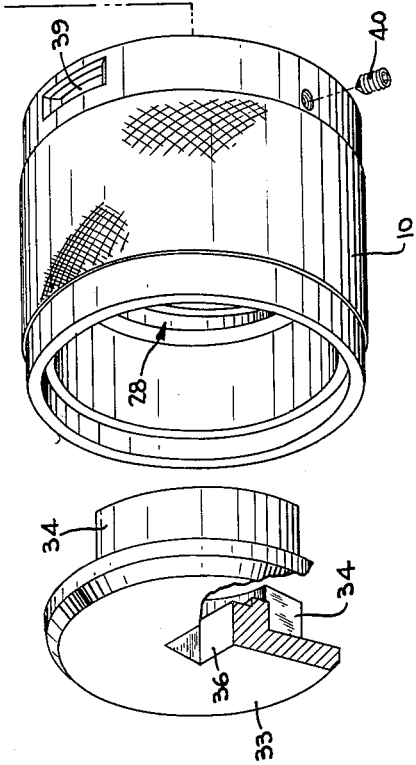
INVENTOR
ERNST SUSSMAN
BY Watson, Cole, Grindle & Watson
ATTORNEYS United States Patent Office 3,068,667
Patented Dec. 18, 1962

3,068,667
ADJUSTABLE TORQUE SENSITIVE COUPLINGS
Ernst Sussman, Biery's Bridge Road, Bethlehem, Pa.
Filed June 5, 1961, Ser. No. 114,806
8 Claims. (Cl. 64—29)

This invention relates to torque sensitive couplings and more particularly to torque sensitive couplings wherein adjustable means are provided to enable presetting of the torque at which the overload release is rendered effective.

It is a primary object of this invention to provide new and improved torque sensitive couplings.

It is another object of this invention to provide torque sensitive couplings having adjustable means for varying the torque calibrations thereof.

It is a further object of this invention to provide torque sensitive couplings which may be driven in either direction.

It is yet another object of this invention to provide torque sensitive couplings wherein the torque calibrations will be the same for either direction of rotation.

It is a still further object of this invention to provide torque sensitive couplings wherein there is no tendency of the driven element to slip in a reverse direction to that of the desired rotation.

It is still another object of this invention to provide torque sensitive couplings having means for initially adjusting the compression member to provide for calibration of the couplings.

It is yet a further object of this invention to provide torque sensitive couplings having means for preventing tampering with the zero adjustment.

With these and other objects in view, the present invention contemplates a torque sensitive coupling including an outer sleeve surrounding a driving element and a driven element. The driving element is provided with a recess of polygonal configuration and a cup-shaped spring retainer of complementary configuration is slidable therein. An intermediate element is disposed between the driving and driven elements and is threadably connected to the interior of the sleeve. The intermediate element is provided with a centrally disposed polygonal recess which surrounds the spring retainer and permits relative axial movement between these elements while precluding relative rotation therebetween. The intermediate element is provided with teeth which mate with corresponding teeth on the driven element to provide the clutch which slips upon overload. The driven element is provided with a shoulder which engages a flange on the spring retainer to couple these members together for axial movement. The driving element mounts a threaded member which extends into the cup-shaped spring retainer through a central aperture therein. A compression spring is interposed between an enlarged head on the threaded member and the bottom of the cup to normally urge the driving and driven elements together which in turn causes firm engagement between the teeth on the intermediate and driven elements. By rotating the sleeve relative to the driving and intermediate elements, the intermediate element may be moved axially with respect to the driving element. Since this movement of the intermediate element also moves the driven element, the bottom of the cup will be moved toward the head of the threaded member and the spring will be further compressed with a consequent increase in the amount of torque which can be transmitted before the teeth will slip on overload.

A scale calibrated in torque units is marked on the periphery of the driving element and may be read through an opening in the sleeve. A set screw is provided for locking the sleeve in any of a plurality of positions to permit presetting various torque values at which the teeth will slip. The coupling may be initially calibrated by moving the threaded member as required so that the torque at which the teeth slip for minimum setting of the sleeve and intermediate element corresponds to the reading on the scale in this position.

Other objects, advantages and novel features of the invention will become readily apparent upon consideration of the following detailed description when read in conjunction with the accompanying drawings wherein:

FIGURE 1 is an exploded perspective view of the torque sensitive coupling of the present invention, and FIGURE 2 is an elevation view, partially in section, of the coupling of the FIGURE 1 in assembled relationship.

Attention now is directed to the drawings wherein like numerals of reference designate like parts throughout the several views and wherein is disclosed a preferred embodiment of the present invention. The coupling comprises an outer sleeve 10, within which are a driving element 11 and a driven element 12. The driving element is positioned for rotation in a counter-bored recess 14 formed in the sleeve 10.

The driving element 11 is provided with a hexagonal recess 15 (FIGURE 1). A cup-shaped spring retainer 16, having a hexagonal exterior configuration, is slidably disposed within the hexagonal recess 15 in the driving element 11. An adjusting screw 18 is positioned in a threaded recess 19 formed in a cylindrical projection 20 on the driving element 11 and disposed centrally within the hexagonal recess 15. The projection 20 is accommodated within the spring retainer cup 16 by means of an aperture 21 (FIGURE 2) formed in the bottom of the retainer. A helical compression spring 22 is positioned within the retainer 16 and is interposed between the bottom of the retainer and a cup member 24 carried by the head of the screw 18. The spring 22 normally urges the spring retainer 16 and screw 18 apart which, as is obvious from FIGURE 2 of the drawings, serves to move the spring retainer 16 toward the bottom of the recess 15.

An intermediate element 25 is mounted for axial movement along the spring retainer 15 by means of a hexagonal socket 26 (FIGURE 1) which slidably receives the spring retainer 16. The intermediate element 25 is threadably connected at 28 to the sleeve 10. The intermediate element 25 is provided with an annular ring of clutch teeth 29 and the driven element 12 is provided with an annular ring of similar teeth 30. The driven element 12 is further provided with a shoulder 31 (FIGURE 1) which is adapted to engage the underside of a flange 32 formed on the spring retainer 16. As is obvious from FIGURE 2 of the drawings, the compression spring 22, in urging the spring retainer 16 toward the bottom of the recess 15, also urges the driven element 12 toward the intermediate element 25 and thus serves to maintain the teeth 29 and 30 in mesh.

A socket member 33 is disposed within the sleeve 10 adjacent the driven element 12. The socket member 33 is provided with a pair of arcuately shaped projections 34. The driven element 12 is provided with a similar pair of arcuately shaped recesses 35 which slidably receive the arcuate projections 34 to provide a driving connection between the driven element 12 and socket member 33 despite a limited axial separation of these parts. The member 33 is provided with a socket 36, of polygonal cross-section, which is adapted to drivingly receive a mating projection of a socket wrench or other tool (not shown) which is to be driven. A cover disc 37 is pressed into a recess in the underside of the socket member 33 and serves both as a dust seal and to preclude tampering with the zero adjustment which will be described later.

The driving element 11 is provided with a series of indicia 38 arranged about the periphery thereof (FIGURE 1) which represents the calibration of the adjustable coupling. The indicia may be in inch-pounds, or any other convenient unit. An aperture 39 is provided in the sleeve 10 for viewing the indicia 38. A set screw 40 is provided in the sleeve 10 for locking the sleeve relative to the driving element 11 by engagement of the set screw 40 with any of a plurality of conical apertures 41 formed in the periphery of the driving element 11 and corresponding to the various indicia 38.

Operation

In order that a better understanding of the invention may be had, its mode of operation will now be described.

During initial assembly of the coupling, the various parts are assembled as illustrated in FIGURE 2 with the exception of the socket member 33 and the cover disc 37. With the intermediate element 25 threaded into the sleeve 10 as far as it will go, the coupling is in its minimum torque position and the lowest calibration of the indicia 38 will be visible in the aperture 39. Torque is then transmitted through the coupling from the driving element 11 to the driven element 12 by any suitable means and this torque is increased until the teeth 29 and 30 begin to slip by sliding over one another. The torque value at which slip occurs is then compared to that indicated by the indicia 38 and the aperture 39. If this torque value is the same as that indicated, then assembly can be completed. Otherwise, the screw 18 is turned in or out as appropriate to vary the force exerted by the spring 22 which holds the teeth 29 and 30 together in torque transmitting relationship. The torque which may be transmitted is, of course, a function of the force holding the driven element 12 and the intermediate element 25 together. The greater this force the greater the torque which may be applied to the coupling before the spring 22 is compressed sufficiently to permit the teeth to slide over one another to successive mating positions. When the screw 18, and hence the compression of the spring 22, has been adjusted so that the coupling slips at the minimum indicated torque, assembly may then be completed by insertion of the disc 37 in the socket member 33 and then positioning the socket member 33 within the sleeve 10 and with the projections 34 mating with the recesses 35 in the driven element 12. The end of the sleeve 10 is then spun over as indicated at 42 to retain the socket member 33 within the sleeve.

To set the coupling for release at some torque value other than the minimum value, the driving element 11 is turned in the direction indicated by the arrow in FIGURE 2 while the sleeve 10 is held stationary. Since the intermediate member 25 is coupled to the driving element 11 through the intermediary of the spring retainer 16, the intermediate element 25 will move toward the socket member 33 due to the threads 28. During rotation of the driving element 11, the driven element 12 and the various intermediate parts all rotate due to the driving connection established between the teeth 29 and 30. However, axial movement of the driving element 11 toward the socket member 33 is precluded by the bottom portion of the counterbore recess 14. Consequently, the driving element 11 and the intermediate element 25 separate axially although a driving connection therebetween is maintained by the spring retainer cup 16. The rotation of driving element 11 is stopped when the indicia representing the desired maximum torque appears in the aperture 39. The various parts will then be in the positions shown in FIGURE 2. At this time the set screw 40 is tightened to preclude movement of the elements 11 and 25 relative to the sleeve 10 which would result in a change in the setting.

Since the driving element 11 is precluded from axial movement toward the socket member 33 as the intermediate element 25 moves, the screw 18 likewise remains in the same axial position. The retainer cup 16 will be carried along with the moving driving element 12 due to engagement between the shoulder 31 and flange 32, and will therefore further compress the spring 22 at it moves toward the cup member 24 on the head of the screw 18. Increased compression of the spring 22 increases the force applied to the driving element 12 and the intermediate element 25 and thus holds the teeth 29 and 30 more firmly together. The coupling will then transmit a greater torque before slipping than when the spring 22 is subjected to a smaller compressive load.

In operation, the teeth will be maintained in full engagement by the spring 22 as long as the preset torque is not approached. For example, if a socket wrench were attached to the driven element 12 and the driving element 11 rotated by a suitable tool, the nut engaged by the socket wrench would be rotated by the coupling without any separation occuring between the teeth 29 and 30. However, as the nut tightens near the end of its travel, an increasing reactive force will be applied to the teeth 30 tending to oppose the torque applied by the coupling. As the torque being applied approaches the preset maximum, the teeth 29 and 30 begin to slide apart along their mating surfaces further compressing the spring 22. When the preset maximum torque is reached, the tips of the teeth 30 will clear the tips of the teeth 29 and will then drop into the next set of spaces between the teeth 29. Continued application of torque to the tool which turns the driving element 11 will only result in repeated skipping of the teeth 30 along the teeth 29 with the sliding action being repeated at each successive position. Thus the coupling will preclude the application of torque in excess of the preselected and preset magnitude despite further rotation of the driving element 11.

It will be understood from the above description that the present invention provides a new and improved torque sensitive coupling which is both simple to construct and operate and which will occupy a minimum of space. The coupling of the present invention is readily adjustable to provide a range of preset torques available between a minimum and a maximum value. By varying spring sizes and the sizes of other parts, different torque ranges may be provided to accommodate different applications. Also, a dust cover has been provided which will keep the interior of the coupling free from dust as well as precluding tampering with the zero adjustment.

It is to be understood that the above described arrangement is simply illustrative of a preferred embodiment of the present invention. Numerous modifications may be readily devised by those skilled in the art to obtain similar devices which will still embody the principles of the present invention and fall within the spirit and scope thereof.

What is claimed is:

1. An adjustable torque sensitive coupling comprising a sleeve, a driving element positioned within said sleeve, a driven element positioned within said sleeve for axial and rotary movement with respect thereto, a first retainer slidably mounted on said driving element, an intermediate element carried by said first retainer for axial movement relative thereto, said intermediate and driven elements being provided with matching teeth which provide a driving connection between said elements when in mesh, means coupling said first retainer to said driven element for axial movement therewith, a second retainer secured to said driving element, a resilient member coupled to said retainers and normally urging said driven element into contact with said intermediate element to retain said teeth in mesh, and means connecting said sleeve and said intermediate element whereby relative rotation advances said intermediate element axially of said sleeve, said connecting means including means for effecting separation of said driving and intermediate elements when said intermediate element moves in one axial direction to further stress said resilient member and thereby increase the force holding said teeth in driving contact.

2. A coupling as defined in claim 1 wherein said teeth are formed on annular axial projections on said driven and intermediate elements.

3. A coupling as defined in claim 1 wherein said retainers are provided with transversely disposed portions and said resilient member is a compression spring interposed between said transverse portions.

4. A coupling as defined in claim 1 wherein means are provided for locking said sleeve and said driving element against relative rotary movement.

5. A coupling as defined in claim 1 wherein an aperture is provided in said sleeve for viewing indicia on said driving element indicating the relative positions of said driving element and said sleeve.

6. A coupling as defined in claim 1 wherein said connecting means comprises mating threads formed on said sleeve and said intermediate element.

7. A coupling as defined in claim 6 wherein said separation effecting means comprises an enlarged portion on said driving element positioned within a counterbored recess in said sleeve.

8. An adjustable torque sensitive coupling comprising an outer cylindrical sleeve, a cylindrical driving element positioned in one end of said sleeve, a cylindrical driven element positioned in the opposite end of said sleeve for axial and rotary movement with respect thereto, a cup-shaped spring retainer of hexagonal exterior configuration slidably disposed within a recess of complementary configuration formed in said driving element, an intermediate element provided with a centrally disposed hexagonal recess carried by said spring retainer for axial movement relative thereto, said driven and intermediate elements being provided with clutch teeth formed on facing, annular, axial projections thereof, said teeth when in mesh providing a driving connection between said driven and intermediate elements, means coupling said cup-shaped spring retainer to said driven element for axial movement therewith, a spring retaining screw having an enlarged head secured to said driving element, the head of said screw being disposed within said cup-shaped retainer and the body thereof passing through a hole formed in the bottom of said cup-shaped retainer, a compression spring interposed between said enlarged head and the bottom of said cup shaped retainer and normally urging said driven and intermediate elements into contact whereby said teeth are maintained in contact and outward axial movement of said driven element is restrained; a threaded connection between said sleeve and said intermediate element whereby relative rotation advances said intermediate element axially of said sleeve, means integral with said sleeve abutting said driving element for effecting separation of said driving and intermediate elements when said intermediate element moves in one axial direction to further compress said spring and thereby increase the force holding said teeth in driving contact, and a set screw threaded in the side of said sleeve for engaging said driving element to lock said sleeve and driving element against relative rotation, said sleeve being provided with an aperture for viewing indicia on said driving element indicating the relative positions in which said drving element and said sleeve are locked by said set screw.

References Cited in the file of this patent
UNITED STATES PATENTS

| 1,126,219 | Hupp | Jan. 26, 1915 |
| 1,237,932 | Marlin | Aug. 21, 1917 |
| 1,657,274 | Niedhammer | Jan. 24, 1928 |
| 1,828,370 | Huddle | Oct. 20, 1931 |
| 2,854,831 | Rothweiler | Oct. 7, 1958 |